United States Patent
Sternberg

(10) Patent No.: US 12,492,517 B2
(45) Date of Patent: Dec. 9, 2025

(54) EQUESTRIAN ARENA SURFACE FILTRATION SYSTEM AND RELATED METHODS

(71) Applicant: Capillary Concrete, LLC, Wellington, FL (US)

(72) Inventor: Martin Sternberg, Wellington, FL (US)

(73) Assignee: Capillary Concrete, LLC, Loxahatchee, FL (US)

( * ) Notice: Subject to any disclaimer, the term of this patent is extended or adjusted under 35 U.S.C. 154(b) by 191 days.

(21) Appl. No.: 18/233,452

(22) Filed: Aug. 14, 2023

(65) Prior Publication Data
US 2024/0052581 A1    Feb. 15, 2024

Related U.S. Application Data

(60) Provisional application No. 63/397,588, filed on Aug. 12, 2022.

(51) Int. Cl.
*E01C 13/00* (2006.01)
*E02B 11/00* (2006.01)

(52) U.S. Cl.
CPC .............. *E01C 13/00* (2013.01); *E02B 11/005* (2013.01)

(58) Field of Classification Search
CPC ... E01H 12/004; E01H 12/008; E02B 11/005; E02B 11/02; E01C 13/00; E01C 13/08
See application file for complete search history.

(56) References Cited

U.S. PATENT DOCUMENTS

| | | | |
|---|---|---|---|
| 5,020,936 A | 6/1991 | Malmgren et al. | |
| 7,473,373 B1* | 1/2009 | Danler | E03F 1/00 210/170.03 |
| 7,578,635 B2* | 8/2009 | Blackwood | E01C 13/02 52/169.5 |
| 8,324,306 B2 | 12/2012 | Attwood et al. | |
| 8,657,695 B2 | 2/2014 | Wilson et al. | |

(Continued)

FOREIGN PATENT DOCUMENTS

| | | |
|---|---|---|
| CN | 106758681 | 5/2017 |
| CN | 113564981 | 10/2021 |

(Continued)

OTHER PUBLICATIONS

Wang et al.; Machine Translation CN 113564981A; All Oct. 29, 2021 (Year: 2021).*

*Primary Examiner* — Benjamin F Fiorello
(74) *Attorney, Agent, or Firm* — Allen, Dyer, Doppelt & Gilchrist, P.A.

(57) ABSTRACT

An equestrian arena surface filtration system includes a plurality of wash drains configured to be buried below an arena surface and each wash drain having a coupling. The system also includes a wash pipe coupled to the plurality of wash drains via a respective coupling and a plurality of wash boxes. Each of the wash boxes has a stub pipe passing therethrough and the stub pipe has an upper end and a lower end. The lower end of the stub pipe is configured to be coupled to the respective coupling. In addition, the tops of the plurality of wash boxes are adjusted to be positioned approximately at a same level as a top of the arena surface so that wash water flooding the arena surface is collected by the plurality of wash boxes and flushed out through the wash pipe.

19 Claims, 3 Drawing Sheets

(56) References Cited

U.S. PATENT DOCUMENTS

| | | | | |
|---|---|---|---|---|
| 10,808,366 B2* | 10/2020 | Tetrault | | E01C 13/083 |
| 2003/0082004 A1* | 5/2003 | Wilkerson | | E01C 13/02 |
| | | | | 405/43 |
| 2003/0198514 A1* | 10/2003 | McCampbell | | E03F 1/002 |
| | | | | 405/41 |
| 2006/0088382 A1* | 4/2006 | Nelson | | E02B 11/00 |
| | | | | 405/41 |
| 2007/0116521 A1* | 5/2007 | Kim | | E01C 13/08 |
| | | | | 405/43 |
| 2012/0196969 A1 | 8/2012 | Adams et al. | | |
| 2017/0094919 A1* | 4/2017 | Sternberg | | A01G 25/023 |
| 2019/0390414 A1* | 12/2019 | Bacher | | E01C 13/02 |
| 2020/0080269 A1* | 3/2020 | Schletzbaum | | E02B 11/005 |
| 2021/0220837 A1* | 7/2021 | Sternberg | | E02B 11/02 |

FOREIGN PATENT DOCUMENTS

| | | |
|---|---|---|
| DE | 202008006572 | 8/2008 |
| GB | 2198322 | 6/1988 |

* cited by examiner

EQUESTRIAN ARENA SURFACE FILTRATION SYSTEM AND RELATED METHODS

CROSS-REFERENCE TO RELATED APPLICATIONS

This application claims the benefit of U.S. provisional application No. 63/397,588 filed Aug. 12, 2022, which is hereby incorporated herein in its entirety by reference.

FIELD

The present invention relates to the field of equestrian arenas, and, more particularly, to an equestrian arena surface filtration system and related methods.

BACKGROUND

An equestrian arena is a building that is specially designed for indoor horse riding. Sand is often used in equestrian arena surfaces because it drains well and dries relatively quickly. The sand needs to be clean and consistent for the horses. However, over time, the weight and concussion of the horse's hooves on the sand will break individual grains into smaller particles, which then become dust and reduces the quality of the arena surface.

Accordingly, the sand must be periodically replaced to remove dust, silt, clay, and anything organic. However, the sand with the requisite characteristics for equestrian arenas is expensive to install and replace.

Therefore, there is a need in the art for a system and method that can efficiently clean the sand of the equestrian arenas rather than being removed and replaced at high expense and effort.

SUMMARY

An equestrian arena surface filtration system is disclosed. The system includes a plurality of rows of wash drains configured to be buried below an arena surface and with each wash drain having a coupling. The system also includes a wash pipe coupled to the plurality of rows of wash drains via a respective coupling and a plurality of wash boxes. Each of the wash boxes has a stub pipe passing therethrough and the stub pipe has an upper end and a lower end. The lower end of the stub pipe is configured to be coupled to the respective coupling. In addition, the tops of the plurality of wash boxes are adjusted to be positioned approximately at a same level as a top of the arena surface so that wash water flooding the arena surface is collected by the plurality of wash boxes and flushed out through the wash pipe.

In another aspect, an equestrian arena is disclosed. The equestrian arena includes an impervious liner defining a lower boundary below an arena surface, a gravel or sand layer on top of the impervious liner, and a pervious concrete layer installed on top of the gravel or sand layer. The arena also includes a footing sand layer installed on top of the pervious concrete layer defining the arena surface, a plurality of wash drains buried below the arena surface, and a wash pipe coupled to the plurality of wash drains. In addition, the equestrian arena may include a drip line within the layer of footing sand configured to disperse water within the layer of footing sand, and a drain line within the gravel layer configured to remove any excess water within gravel or sand layer. The arena may also include a plurality of wash boxes that are removable, where each wash box has a stub pipe passing therethrough and the stub pipe has an upper end and a lower end. The lower end of the stub pipe is configured to be removably coupled to a respective wash box so that the plurality of wash boxes can be removed from the equestrian arena when not being used. The upper end of the stub pipe may extend above a bottom of the respective wash box to capture footing sand and prevent it from being drained out the wash pipe with the wash water and other debris. The wash drains may have a marker configured to identify a location of each of the wash drains when buried in the footing sand.

In yet another aspect, a method of cleaning a surface of an equestrian arena is disclosed. The method includes coupling a plurality of wash boxes to a plurality of wash drains buried under a surface of the equestrian arena, where each wash box has a stub pipe passing therethrough and the stub pipe has an upper end and a lower end, where the lower end of the stub pipe is configured to be removably coupled to the respective wash drain. The method also includes flooding the surface of the equestrian arena with wash water and draining the wash water into the plurality of wash boxes and out through the wash pipe along with debris entrained within the wash water. In addition, the method includes adjusting tops of the plurality of wash boxes to be positioned approximately at a same level as a top of the surface of the equestrian arena.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
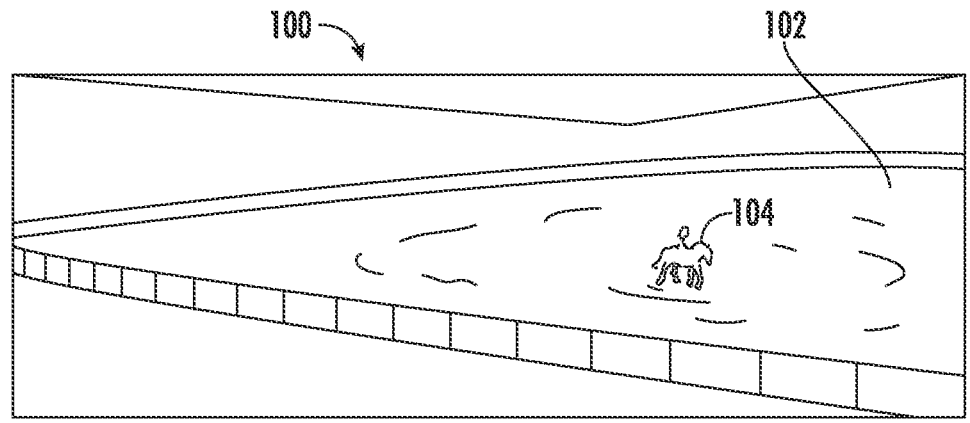
FIG. 1 is a perspective view of an equestrian arena.
Figure 2:
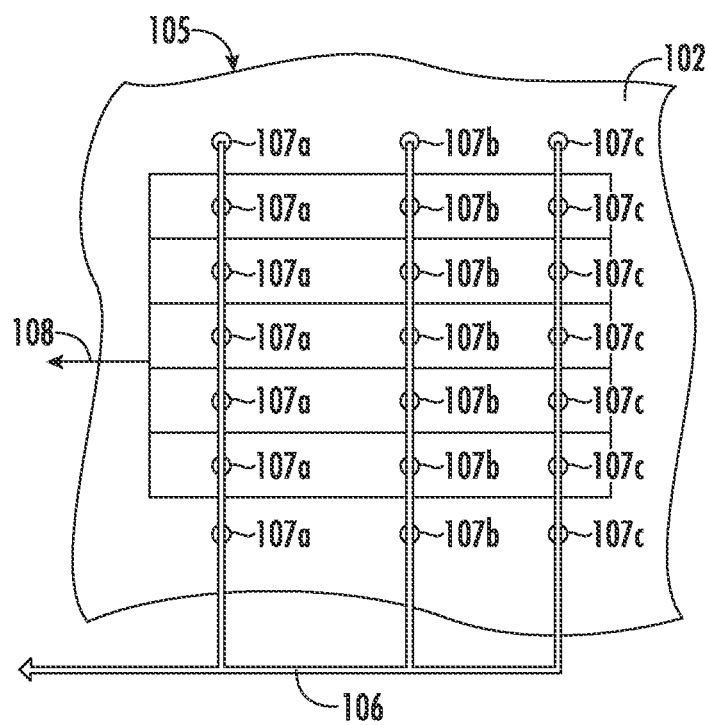
FIG. 2 is a layout schematic of an equestrian arena surface filtration system in accordance with particular aspects of the invention disclosed herein.

Referring now to FIG. 1, an equestrian arena 100 is shown where the filtration system discussed below may be installed. The arena surface 102 may degrade over time from running and jumping activities of the horses 104 in addition to manure from the horses. The arena surface 102 is generally level and may have a variety of different sizes and shapes.

The filtration system is generally designated 105 and includes a plurality of rows of wash drains 107a, 107b, 107c buried below the arena surface 102. The wash drains 107a, 107b, 107c are coupled to a wash pipe 106 that collects the wash water and may empty into a treatment facility. As those of ordinary skill in the art can appreciate, the configuration of the wash drains can be varied. In addition, a typical perforated drain pipe 108 may also be installed below the arena surface 102 that is used for normal drainage purposes and to remove any excess water after flooding the arena with wash water.

Figure 3:
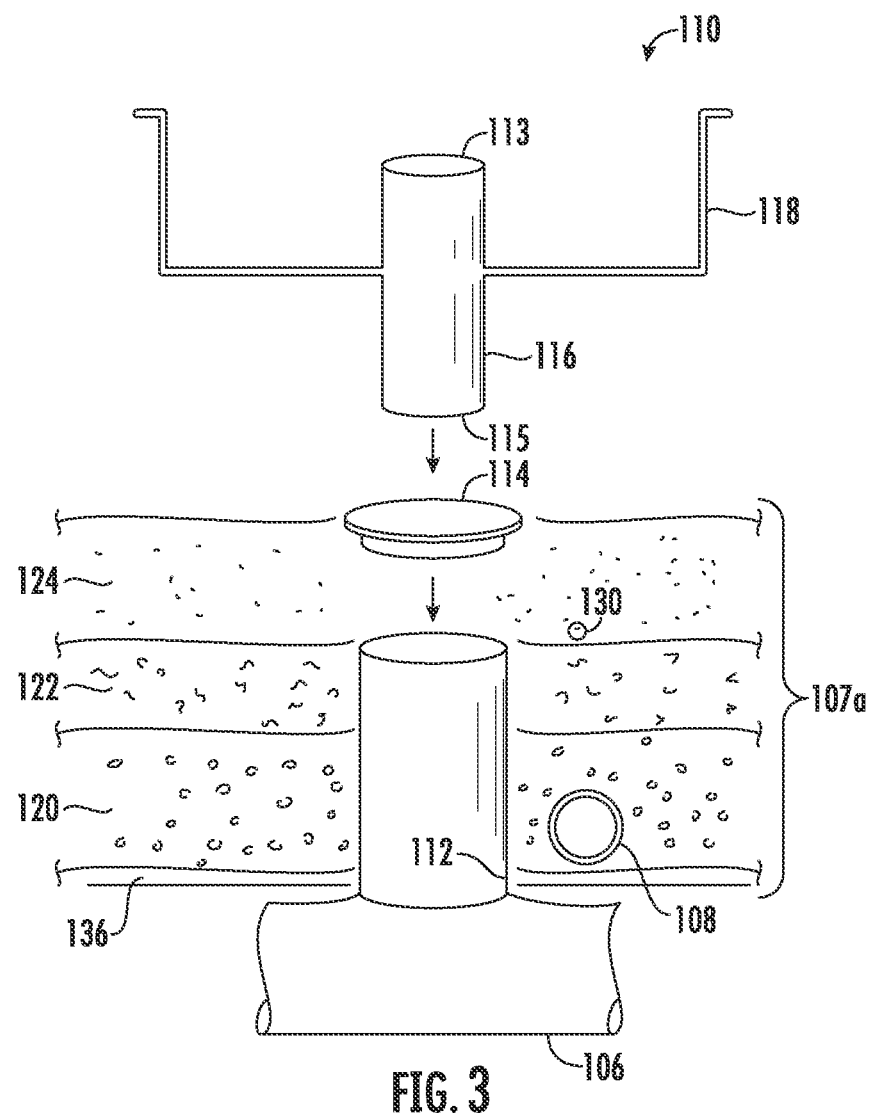
FIG. 3 is an exploded view of a wash box and wash pipe of the filtration system of FIG. 3.

Referring now to FIG. 3, an exploded view of an exemplary wash box 110 and an exemplary wash drain 107a is depicted. The wash box 110 includes a stub pipe 116 that has an upper end 113 and a lower end 115. The lower end 115 is configured to slide into or otherwise be connected to a wash drain coupling 112. The wash drain coupling 112 comprises a vertical pipe in fluid communication with the wash pipe 106.

The wash box 110 is used during the washing process of the arena surface materials as explained below. Otherwise, a cover 114 is installed over the wash drain coupling 112 to keep the surface materials from falling inside and into the wash pipe 106 when the wash box 110 is not being used. This is because the wash drain coupling 112 is buried below the surface of the arena.

Figure 4:
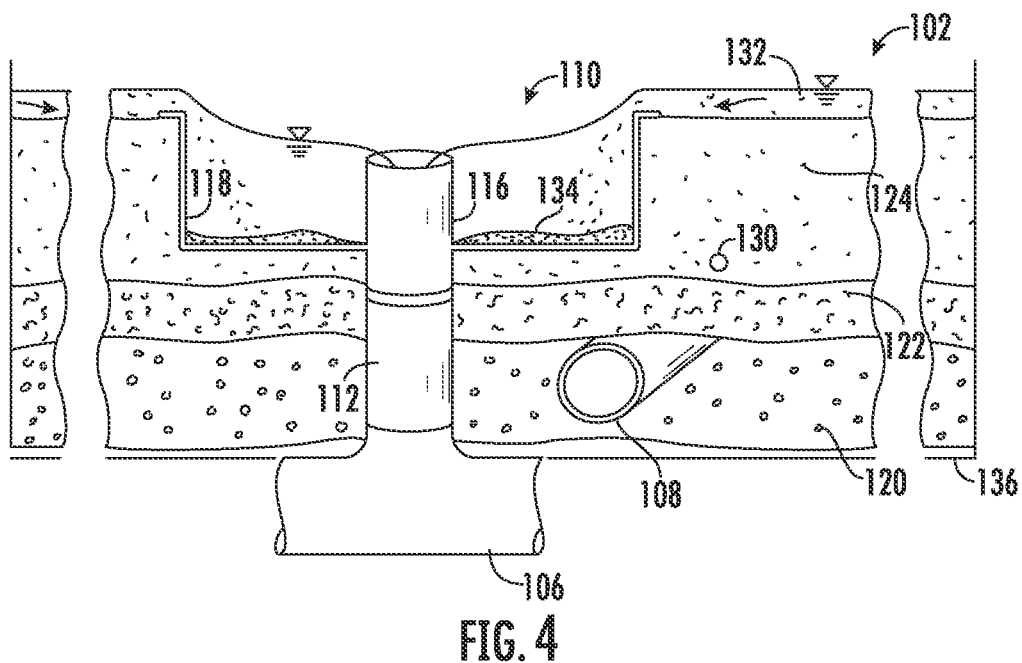
FIG. 4 is a cross sectional view of the wash box installed within the equestrian arena surface materials.

As shown in FIG. 4, the wash box 110 is connected to the wash box coupling 112 during the washing process. The composition of the arena may include a liner 136 with a gravel or sand layer 120 on top. The gravel or sand layer 120 may be four to five inches in height. A pervious concrete such as Capillary Concrete® may be installed on top of the gravel layer 120. The pervious concrete layer 122 may be approximately two inches in height. A top layer of footing sand 124 is installed on top of the pervious concrete layer 122 and may be six to eight inches in height. A drip line 130 may be installed within the footing sand layer 124. The drain line 108 may also be installed within the gravel layer 120 and the wash pipe 106 being installed below the gravel layer 120. As those of ordinary skill in the art can appreciate, the composition of the arena may vary and have less or more layers of materials.

In operation, each of the wash drains 107a, 107b, 107c must be exposed by digging out the sand until the respective cover 114 is visible. The cover 114 may have whiskers or other markers so that it can be more easily located within the footing sand layer 124 when buried. The cover 114 may have a transmitter, RFID tag, metal, or other device, for example, so that it can be detected.

Once located, the respective cover 114 is removed and the wash box stub pipe 116 is slid inside the wash drain coupling 112 or is otherwise connected thereto and is height adjustable. The top of the wash box 110 is adjusted to be positioned approximately at the same level as the top of the footing sand layer 124. Once the plurality of wash boxes 110 are installed to the respective couplings 112, wash water 132 is used to flood the arena surface 102.

Accordingly, the wash water 132 stirs up the debris in the sand layer 120. The debris includes clay, silt particles and anything organic, such as manure, in the sand. The debris is slurred into the wash water 132 and floats. The debris is carried towards a wash box 110 and flows into the upper end of the wash box stub pipe 116 and out to the wash pipe 106. If sand is carried into the wash box 110 then it will settle and be caught in sediment compartment 118.

Wash water 132 is continued to be pumped onto the arena surface 102 and this action cleans the sand of dirt and fine particles and makes it suitable for equestrian activities again because the sand particles stay but the dirt and silt/clay is removed.

Figure 5:
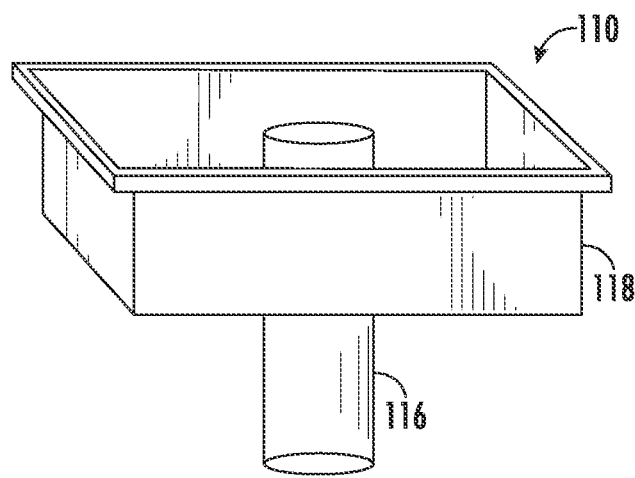
FIG. 5 is a perspective view of the wash box of FIG. 4.

Referring now to FIG. 5, a perspective view of the wash box 110 is depicted. The wash box 110 may be approximately eighteen inches in length and width and five inches deep. However, as those of ordinary skill in the art can appreciate, the size and shape of the wash box 110 may vary.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined herein.

That which is claimed is:

1. An equestrian arena surface filtration system comprising:
a plurality of wash drains configured to be buried below an equestrian arena surface;
a wash pipe coupled to the plurality of rows of wash drains; and
a plurality of wash boxes, each wash box having a stub pipe passing therethrough and the stub pipe having an upper end and a lower end, wherein the lower end of the stub pipe is configured to be coupled to the wash pipe;
wherein tops of the plurality of wash boxes are adjusted to be positioned approximately at a same level as a top of the equestrian arena surface so that wash water flooding the arena surface is collected by the plurality of wash boxes and flushed out through the wash pipe.

2. The system of claim 1, further comprising an impervious liner defining a lower boundary below the equestrian arena surface.

3. The system of claim 2, further comprising a gravel or sand layer on top of the impervious liner.

4. The system of claim 3, further comprising a pervious concrete layer installed on top of the gravel or sand layer.

5. The system of claim 4, further comprising a footing sand layer installed on top of the pervious concrete layer and defining the equestrian arena surface.

6. The system of claim 5, further comprising a drip line within the layer of footing sand configured to disperse water within the layer of footing sand.

7. The system of claim 6, further comprising a drain line within the gravel layer configured to remove any excess water within gravel or sand layer.

8. The system of claim 1, wherein the upper end of the stub pipe extends above a bottom of the respective wash box.

9. The system of claim 1, wherein the wash drains have a marker configured to identify a location of each of the wash drains when buried in the footing sand.

10. An equestrian arena comprising:
an impervious liner defining a lower boundary below an arena surface;
a gravel or sand layer on top of the impervious liner;
a pervious concrete layer installed on top of the gravel or sand layer;
a footing sand layer installed on top of the pervious concrete layer and defining the arena surface;
a plurality of wash drains buried below the arena surface;
a wash pipe coupled to the plurality of wash drains; and
a plurality of wash boxes, wherein each wash box having a stub pipe passing therethrough and the stub pipe having an upper end and a lower end, wherein the lower end of the stub pipe is configured to be removably coupled to a respective wash drain so that the plurality of wash boxes can be removed from the equestrian arena when not being used.

11. The equestrian arena of claim 10, further comprising a drip line within the layer of footing sand configured to disperse water within the layer of footing sand.

12. The system of claim 10, further comprising a drain line within the gravel layer configured to remove any excess water within gravel or sand layer.

13. The equestrian arena of claim 10, wherein tops of the plurality of wash boxes are adjusted to be positioned approximately at a same level as a top of the arena surface so that wash water flooding the arena surface is collected by the plurality of wash boxes and flushed out through the wash pipe.

14. The system of claim 13, wherein the upper end of the stub pipe extends above a bottom of the respective wash box.

15. The system of claim 14, wherein the wash drains have a marker configured to identify a location of each of the wash drains when buried in the footing sand.

16. A method of cleaning a surface of an equestrian arena having a plurality of wash drains buried below the arena surface coupled to a wash pipe, the method comprising:

coupling a plurality of wash boxes to the plurality of wash drains, wherein each wash box having a stub pipe passing therethrough and the stub pipe having an upper end and a lower end, wherein the lower end of the stub pipe is configured to be removably coupled to the respective wash drain;

flooding the surface of the equestrian arena with water; and draining the water into the plurality of wash boxes and out through the wash pipe along with debris entrained within the water.

17. The method of claim 16, further comprising adjusting tops of the plurality of wash boxes to be positioned approximately at a same level as a top of the surface of the equestrian arena.

18. The method of claim 17, wherein the upper end of the stub pipe extends above a bottom of the respective wash box.

19. The method of claim 18, wherein the equestrian arena comprises an impervious liner defining a lower boundary below the surface, a gravel or sand layer on top of the impervious liner, a pervious concrete layer installed on top of the gravel or sand layer, and a footing sand layer installed on top of the pervious concrete layer and defining the surface of the equestrian arena.

* * * * *